United States Patent [19]
Fisher et al.

[11] 3,931,494
[45] Jan. 6, 1976

[54] RECHARGEABLE BATTERY HEATING UNIT

[76] Inventors: Barbara Fisher, c/o George Spector, 3615 Woolworth Bldg., 233 Broadway; George Spector, 3615 Woolworth Bldg., 233 Broadway, both of New York, N.Y. 10007

[22] Filed: Apr. 1, 1975

[21] Appl. No.: 564,094

[52] U.S. Cl. ............... 219/441; 219/386; 219/435; 219/521
[51] Int. Cl.² .................................. F27D 11/02
[58] Field of Search .......... 219/268, 385, 386, 387, 219/432, 433, 435, 436, 438, 439, 441, 442, 521; 136/161; 126/261

[56] References Cited
UNITED STATES PATENTS

| | | |
|---|---|---|
| 2,277,605 | 3/1942 | Palitzsch .......................... 219/439 |
| 2,516,637 | 7/1950 | McCollum ........................ 219/433 |
| 2,915,614 | 12/1959 | Loomis ............................. 219/441 |
| 3,226,528 | 12/1965 | Martin .............................. 219/441 |
| 3,247,360 | 4/1966 | Ponder ............................. 219/436 |
| 3,277,271 | 10/1966 | Hunt ................................. 219/268 |
| 3,290,484 | 12/1966 | Day ................................... 219/441 |
| 3,432,641 | 3/1969 | Welke ............................... 219/433 |
| 3,482,078 | 12/1969 | Milne ................................ 219/387 |
| 3,549,861 | 12/1970 | Trachtenberg et al. ............ 219/441 |

*Primary Examiner*—Volodymyr Y. Mayewsky

[57] ABSTRACT

An improved warming container which may comprise either a cup, pot, bowl or the like, and which includes an electric heating element built into its bottom and side walls, the heating element being connected to a rechargeable battery, thermostat and switch located on its underside and which are completely enclosed so to allow the vessel being fully submerged during washing without damage to the electric system.

2 Claims, 6 Drawing Figures

U.S. Patent   Jan. 6, 1976   3,931,494
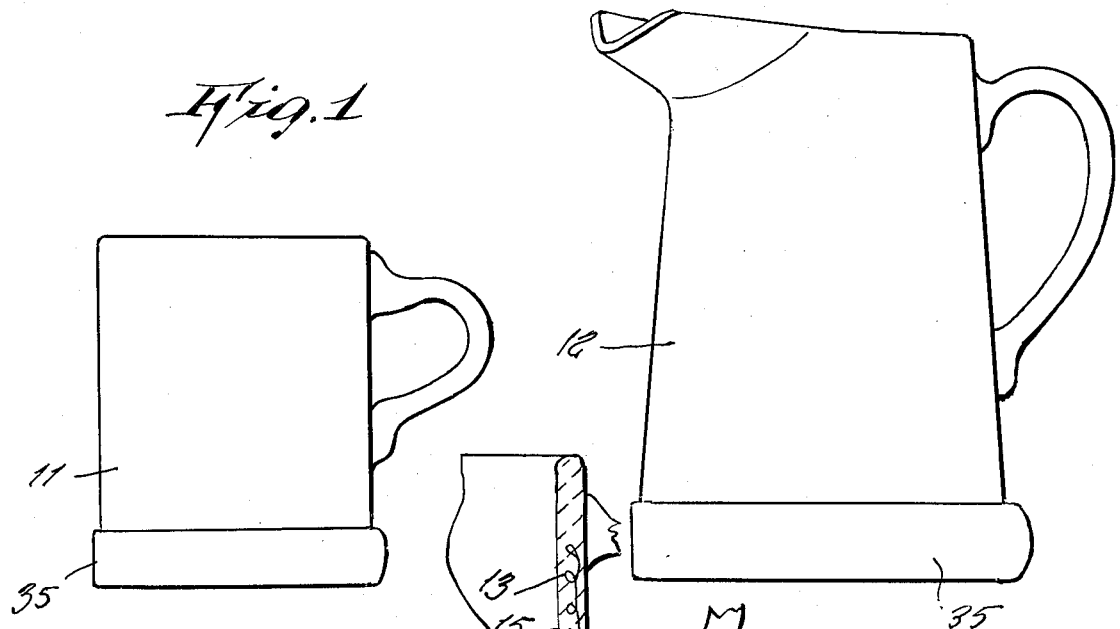
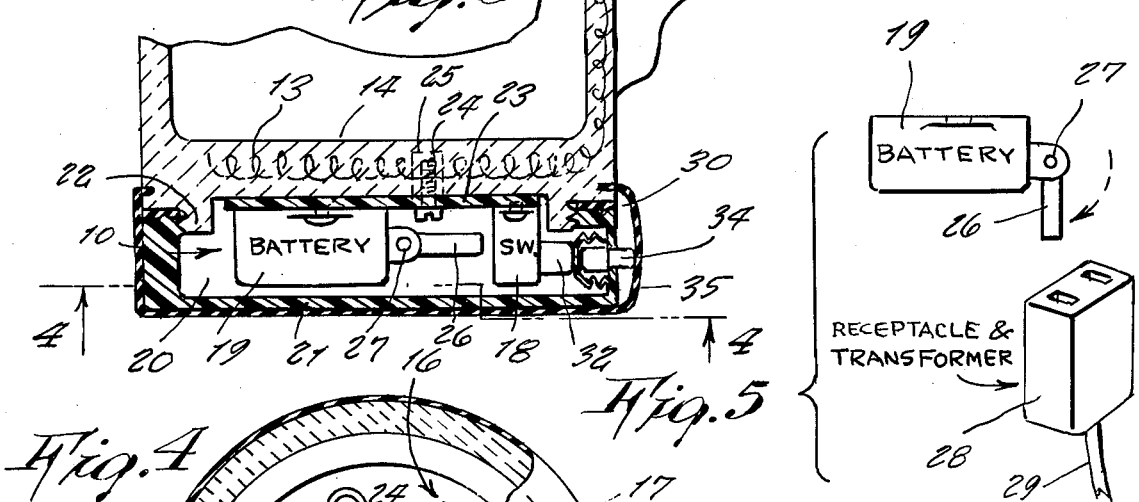
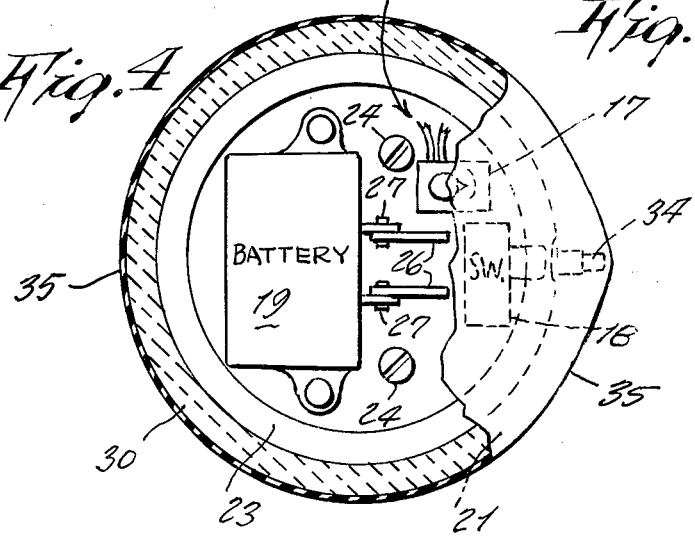
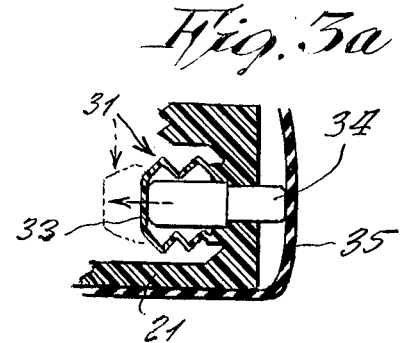

RECHARGEABLE BATTERY HEATING UNIT

This invention relates generally to dishware vessels such as cups, soup bowls, tea or coffee pots and the like.

A principal object of the present invention is to provide a heating unit built into a dishware vessel so that the vessel content may be maintained warm or hot without cooling during the course of a meal.

Another object is to provide a heating unit which is battery operated so that there are no wires hanging from the vessel during use, and wherein there is also an adjustable thermostat so that any desired temperature of heat may be steadily maintained throughout its time of use.

Another object is to provide a heating unit which includes a manually operated switch for turning the heating system on or off, and which, although accessible to being pushed by a person's finger, is completely enclosed so that no water gets to the eletric system when the vessel is fully submerged during dish washing.

Other objects are to provide a rechargeable battery heating unit which is simple in design, inexpensive to manufacture, rugged in construction, easy to use and efficient in operation.

These and other objects will be readily evident upon a study of the following specification and the accompanying drawing wherein:

FIG. 1 is a side view of a cup incorporating the present invention.

FIG. 2 is a side view of a pitcher incorporating the invention.

FIG. 3 is a side cross section thereof showing a plastic ccap screw threaded on the bottom of the cup or pitcher, and which is fitted with a gasket so to seal watertight a battery and switch that controls the heating coil, thus allowing the cup or pitcher to be fully submerged when dishwashing without any danger of water getting to the electrical parts.

FIG. 3a shows the structure of FIG. 3 enlarged and showing how the switch plunger that operates the switch is completely outside of the cap so water cannot get inside, even though the plunger by means of an expandable accordian socket can push the switch button located inside.

FIG. 4 is a view in direction 4–4 of FIG. 3.

FIG. 5 shows how the battery is recharged, by first unscrewing the cap and then swinging the battery prongs down so to be engagable with a plug on a power cord of a house.

Referring now to the drawing in detail, the reference numeral 10 represents a rechargeable battery heating unit according to the present invention which may be incorporated either into a cup 11 as shown in FIG. 1, a tea or coffee pot 12 as shown in FIG. 2, or which may be incorporated in a soup bowl, a serving dish or any other vessel, not shown in the drawing.

The heating unit 10 includes an electric heating coil 13 that is molded into the bottom 14 and side wall 15 of the vessel. As shown in FIG. 3, wherein the vessel comprises a drinking cup, the heating coil does not extend up into the upper end of the side walls, so that a person will not burn his lips when they touch the cup while drinking therefrom.

The heating coil 13 is in an electric circuit 16 that includes a thermostat 17 on-off switch 18 and battery 19 all of which are contained within a compartment 20 formed under the cup botton wall 14 by means of a bottom cap 21 that screws on a threaded underside flange 22 of the bottom wall.

The cap 21 is removable in order that the battery is accessible so to be rechared. The battery switch and thermostat are mounted on an underside of a plastic support place 23 secured by means of screws 24 into plugs 25 inserted into openings on the underside of the bottom wall 14. In order that the height of the cap may be kept at minimum, the battery is designed to incorporate its own plug prongs 26 for purpose of recharging, and these prongs extend horizontally, instead of downward, so to not require the compartment to be made taller. However, when the battery is needed to be recharged, the cap 21 is unscrewed and removed, after which the prongs 26 are pivoted downward about pins 27, as shown in FIG. 5 so that they can be plugged into female receptacle 28 on one end of an extension cord 29 which at its other end has a plug for connection to a household electric outlet socket. The receptacle 28 also incorporates a transformer so to change household 120v. current to a low voltage that is suitable for circuit 16.

It is to be noted that in order to allow complete submerging of the vessel in water during dishwashing, a rubber gasket 30 is fitted between the cap and vessel so to make the compartment 21 watertight. Additionally, for the same reason, the switch contained inside the sealed compartment is made to be operated from an exterior by means of a flexible accordian boot 31 formed integrally with the semi-flexible plastic cap 21, as best shown in FIG. 3a. The switch button 32 of the switch abuts against the interior side of the boot end wall 33 while a separate button 34 located externally of the compartment, bears against the outer side of boot end wall 33. Thus the boot allows movement of the switch button 32 inside the compartment without allowing water to enter.

In use it is now evident that whenever the heating unit is wished to be used, a person needs only to depress the button 34. Whenever the battery is run down, the cap is unscrewed and the battery prongs are pivoted down for connection to receptacle 28. After being recharged the cap is replaced, and the device is ready for reuse.

As shown in the drawing, a flexible rubber boot 35 may be fitted additionally around the bottom of the vessel in order to also enclose the button 34 from view so that the vessel is more pleasing in appearance. The boot will bulge slightly where it extends around the button, but such bulge will be slight, and will aid in locating the button position in order that it may be depressed.

While various changes may be made in the detail construction, it is understood that such changes will be within the spirit and scope of the present invention, as is defined by the appended claims:

What iss claimed is:

1. In a vessel incorporating a rechargeable battery heating unit; the combination of a vessel formed of dielectric material and an electric heating system integral therewith and comprising an electric circuit consisting of a heating coil, thermostat, on-off switch and rechargeable battery, said heating coil being molded in a bottom wall and in a side wall of said vessel, said thermostat, on-off switch and battery being contained within a compartment formed below said bottom wall by a removable bottom cap screwed thereon and sealed water tight by a rubber gasket, said battery being integral with plug means consisting of a pair of plug prongs, said prongs being pivotable about transverse pins, thereby allowing said prongs to be connected to a female receptacle of an extension electric cord for recharging said battery, said cap being made of semi-flexible plastic and includes a resilient, accordian boot integrally formed therethrough, an inner side of an end wall of said boot bearing against a push button of said on-off switch, and an outside of said boot end wall having an external button bearingthereagainst.

2. The combination as set forth in claim 1 wherein a lower end of said vessel is additionally enclosed within a flexible rubber boot that includes a bottom wall enjoined to a relatively low side wall, said side wall enclosing said button, and an upper edge of said boot side wall having a radially inwardly extending bead that snap fits in an annular groove formed around said vessel.

* * * * *